(12) United States Patent
Cho et al.

(10) Patent No.: US 9,001,541 B2
(45) Date of Patent: Apr. 7, 2015

(54) SWITCH CONTROL CIRCUIT, POWER FACTOR CORRECTOR INCLUDING THE SAME, AND DRIVING METHOD OF THE POWER FACTOR CORRECTOR

(75) Inventors: Gye-Hyun Cho, Incheon (KR); Hyun-Chul Eom, Seoul (KR); Seunguk Yang, Anyang-si (KR); Young-Bae Park, Anyang (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 477 days.

(21) Appl. No.: 13/584,408

(22) Filed: Aug. 13, 2012

(65) Prior Publication Data

US 2013/0044520 A1     Feb. 21, 2013

(30) Foreign Application Priority Data

Aug. 17, 2011   (KR) .................. 10-2011-0081884

(51) Int. Cl.
*H02M 7/539* (2006.01)
*H02M 1/42* (2007.01)

(52) U.S. Cl.
CPC .......... *H02M 1/4258* (2013.01); *H02M 1/4208* (2013.01); *Y02B 70/126* (2013.01)

(58) Field of Classification Search
USPC .......... 363/21.01, 21.04, 21.05, 21.08, 21.13, 363/21.16, 97
See application file for complete search history.

(56) References Cited

U.S. PATENT DOCUMENTS

| | | | |
|---|---|---|---|
| 6,304,473 B1* | 10/2001 | Telefus et al. | 363/97 |
| 2011/0193494 A1* | 8/2011 | Gaknoki et al. | 315/297 |
| 2011/0194212 A1* | 8/2011 | Lim et al. | 360/294 |
| 2011/0194311 A1* | 8/2011 | Gaknoki et al. | 363/21.12 |
| 2013/0044520 A1* | 2/2013 | Cho et al. | 363/21.17 |
| 2013/0301309 A1* | 11/2013 | Chen | 363/21.12 |
| 2014/0218978 A1* | 8/2014 | Heuken et al. | 363/21.16 |

* cited by examiner

*Primary Examiner* — Jeffrey Sterrett
(74) *Attorney, Agent, or Firm* — Okamoto & Benedicto LLP (57) ABSTRACT

The present invention relates to a switch control circuit, a power factor corrector including the same, and a driving method thereof. According to an exemplary embodiment of the present invention, a turn-on time of a power switch is controlled according to a zero crossing voltage to sense a voltage of both terminals of the power switch, and a turn-off time of the power switch is controlled according to a feedback voltage corresponding to the output voltage. At this time, the switching frequency of the power switch is sensed by the zero crossing voltage and the switching frequency is restricted by a predetermined threshold frequency.

20 Claims, 5 Drawing Sheets

SWITCH CONTROL CIRCUIT, POWER FACTOR CORRECTOR INCLUDING THE SAME, AND DRIVING METHOD OF THE POWER FACTOR CORRECTOR

CROSS-REFERENCE TO RELATED APPLICATION

This application claims priority to and the benefit of Korean Patent Application No. 10-2011-0081884 filed in the Korean Intellectual Property Office on Aug. 17, 2011, the entire contents of which are incorporated herein by reference.

BACKGROUND OF THE INVENTION (a) Field of the Invention

The present invention relates to a switch control circuit, a power factor corrector, and a driving method thereof.

(b) Description of the Related Art

An ampere total harmony distortion (referred to as "ATHD".) may be generated when a high voltage is input to a power factor corrector.

For example, a conventional single stage power factor corrector is realized by a flyback converter, and is operated with a critical conduction mode. In the single stage power factor corrector, an input current may be distorted by a primary reflection voltage.

A waveform of the input current according to the critical conduction mode is influenced by a duty of the flyback converter, and the duty is determined by an input voltage ratio (VIN/VR) between the input voltage VIN and the primary reflected voltage (VR). The primary reflected voltage (VR) is a voltage of which a turn ratio n is multiplied by a sum of an output voltage of the flyback converter and a voltage of both terminals of a secondary rectification diode. In detail, Equation 1 represents the duty (d) in the critical conduction mode.

$$d = \frac{1}{1 + \frac{V_{In}^{Peak}}{V_R} \cdot |\sin(\Theta)|} \quad \text{(Equation 1)}$$

Here, the input voltage VIN is a voltage on which an AC input is full-rectified such that it is dependant on a sine wave, and the input voltage VIN is dependant on a value $V_{In}^{Peak} \cdot |\sin(\Theta)|$ of which a sine function $\sin(\Theta)$ is multiplied by a peak ($V_{In}^{Peak}$) of the input voltage. In Equation 1, $$\frac{V_{In}^{Peak}}{V_R} \cdot |\sin(\Theta)|$$

represents an input voltage ratio.

Also, the input current is represented by Equation 2.

$$I_{In}(\theta) = \frac{1}{2} \cdot I_{Q1}^{MaxPeak} \cdot |\sin(\Theta)| \cdot d \quad \text{(Equation 2)}$$

$$= I_{Q1}^{MaxPeak} \cdot \frac{|\sin(\Theta)|}{2 \cdot \left(1 + \frac{V_{In}^{Peak}}{V_R} |\sin(\Theta)|\right)}$$

Herein, $I_{Q1}^{MaxPeek}$ means a peak of the current flowing to a power switch of the flyback converter.

As described above, the input current receives the input voltage ratio such that it may be distorted, and may not be dependant on the sine wave.

Figure 1:
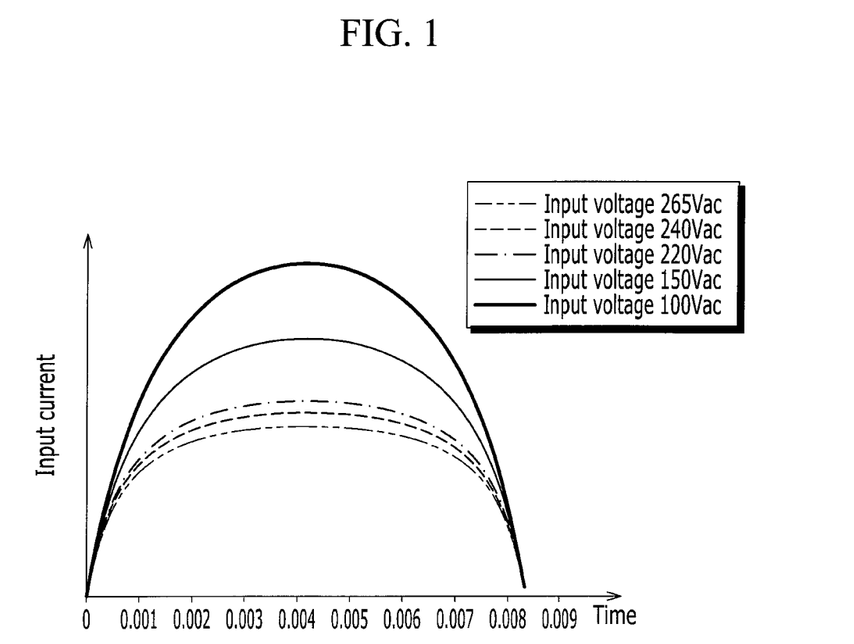
FIG. 1 is a waveform diagram of an input current of a conventional single stage power factor corrector according to an input voltage ratio.

FIG. 1 is a waveform diagram showing an input current of a conventional stage power factor corrector according to an input voltage ratio.

As shown in FIG. 1, as the input voltage ratio is increased, the waveform of the input current is not dependant on the sine wave. In detail, as the input voltage ratio is increased, a deformation degree of which the input current is increased near a zero current and then is flat in a peak region is increased. Thus, a difference for the waveform of the input voltage is increased.

Figure 2:
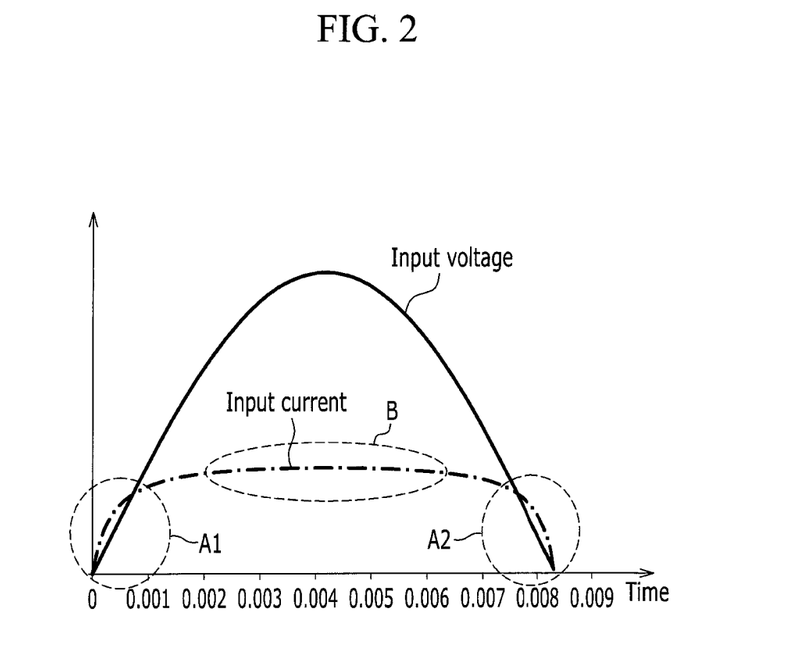
FIG. 2 is a waveform diagram showing a waveform of an input current along with an input voltage when the input voltage is 265Vac.

FIG. 2 is a waveform diagram showing a waveform of an input current along with an input voltage when an input voltage is 265Vac.

As shown in FIG. 2, compared with the waveform of the input voltage, that is, the sine wave, the input current has a steep slope near the zero currents A1 and A2 and a shallow slope near a peak current B.

This difference between the waveform of the input current and the sine wave causes the ampere total harmony distortion. It is preferable that the ampere total harmony distortion of the power factor corrector is small.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention decreases ampere total harmony distortion according to a change of an input voltage in a power factor corrector.

A power factor corrector according to an exemplary embodiment of the present invention includes a power switch and a switch control circuit. The switch control circuit receives a zero crossing voltage to sense the voltage of both terminals of the power switch and a feedback voltage corresponding to an output voltage, controls a turn-on time of the power switch by using the zero crossing voltage, and controls a turn-off time of the power switch by using the feedback voltage. The switch control circuit senses a switching frequency of the power switch by using the zero crossing voltage and restricts the switching frequency by a predetermined threshold frequency.

The switch control circuit controls the turn-on time of the power switch by using the zero crossing voltage after a predetermined screen period corresponding to the threshold frequency from a time that the power switch is turned off.

The switch control circuit includes a zero crossing detection comparator controlling a zero crossing reference voltage to control the turn-on time and the zero crossing voltage and generating a zero crossing detection signal according to a comparison result, and a frequency restriction unit generating the on control signal to turn on the power switch in synchronization with the zero crossing detection signal of an enable level generated after the screen period is passed.

The zero crossing detection comparator includes an inversion terminal input with the zero crossing voltage and a non-inversion terminal input with the zero crossing reference voltage, and generates the zero crossing detection signal of the enable level at a time that the zero crossing voltage becomes lower than the zero crossing reference voltage.

The zero crossing detection comparator is realized as a hysteresis comparator, the zero crossing reference voltage includes a first reference voltage level and a second reference voltage level higher than the first reference voltage level according to a hysteresis characteristic, and the zero crossing detection comparator generates the zero crossing detection signal of the enable level at a time that the zero crossing voltage is lower than the first reference voltage.

The switch control circuit further includes a duty comparator comparing a sawtooth wave that is increased with a constant slope during the turn-on period of the power switch and the feedback voltage and generating an off control signal according to a comparison result, and an SR flip-flop turning on the power switch according to the on control signal and generating a gate control signal turning off the power switch according to the off control signal.

The duty comparator includes an inversion terminal input with the feedback voltage, and a non-inversion terminal input with the sawtooth wave, and the SR flip-flop generates the gate control signal turning on the power switch in synchronization with the increasing edge of the on control signal and turning off the power switch in synchronization with the increasing edge of the off control signal.

The power factor corrector further includes an assistance coil having a primary coil of a primary side transmitted with the input voltage, a secondary coil of a secondary side with which the output voltage is generated, and a predetermined turn ratio with the primary coil, and the zero crossing voltage is dependant on an assistance voltage generated at the assistance coil.

The switch control circuit includes a zero crossing detection comparator comparing a predetermined zero crossing reference voltage to control the turn-on time of the power switch and the zero crossing voltage, a resistor having one terminal connected to the zero crossing detection comparator and the other terminal connected to the assistance coil, and a capacitor connected to one terminal of the resistor.

A method of driving a power factor corrector according to an exemplary embodiment of the present invention receives an input voltage and generates an output voltage according to a switching operation of a power switch. The driving method includes controlling a turn-on time of the power switch for a switching frequency of the power switch to not exceed a predetermined threshold frequency by using a zero crossing voltage to sense the voltage of both terminals of the power switch, and controlling the turn-off time of the power switch by using a feedback voltage corresponding to the output voltage.

The controlling of the turn-on time includes controlling the turn-on time of the power switch by using the zero crossing voltage after a predetermined screen period corresponding to the threshold frequency from a time that the power switch is turned off.

The controlling of the turn-on time includes comparing the zero crossing reference voltage to control the turn-on time and the zero crossing voltage and generating the zero crossing detection signal according to the comparison result, and generating the on control signal to turn on the power switch in synchronization with the zero crossing detection signal of an enable level generated after the screen period is passed.

The generating of the zero crossing detection signal includes generating the zero crossing detection signal of the enable level at a time that the zero crossing voltage is lower than the zero crossing reference voltage.

The zero crossing detection comparator is realized by a hysteresis comparator, the zero crossing reference voltage includes a first reference voltage level and a second reference voltage level higher than the first reference voltage level according to a hysteresis characteristic, and the generating of the zero crossing detection signal of the enable level is generating the zero crossing detection signal of the enable level at a time that the zero crossing voltage is lower than the first reference voltage.

The controlling of the turn-off time includes comparing a sawtooth wave that is increased with a constant slope during the turn-on period of the power switch and the feedback voltage, and controlling the turn-off time according to the comparison result.

The power factor corrector further includes a primary coil of a primary side transmitted with the input voltage, a secondary coil of a secondary side with which the output voltage is generated, and an assistance coil having a predetermined turn ratio with the primary coil, and the zero crossing voltage is dependant on the assistance voltage that is generated at the assistance coil.

A switch control circuit of a power factor corrector according to an exemplary embodiment of the present invention receives an input voltage and generates an output voltage according to a switching operation of a power switch, and includes: a zero crossing detection comparator comparing a zero crossing voltage to sense the voltage of both terminals of the power switch and a zero crossing reference voltage to control the turn-on time and generating the zero crossing detection signal according to the comparison result; and a frequency restriction unit generating an on control signal to turn on the power switch in synchronization with the zero crossing detection signal of an enable level after the screen period is passed, wherein the screen period is a period corresponding to the threshold frequency when the switching frequency of the power switch is restricted by a predetermined threshold frequency.

The zero crossing detection comparator is realized a hysteresis comparator, the zero crossing reference voltage includes a first reference voltage level and a second reference voltage level higher than the first reference voltage level according to a hysteresis characteristic, and the zero crossing detection comparator generates the zero crossing detection signal of the enable level at a time that the zero crossing voltage is lower than the first reference voltage.

The switch control circuit further includes a duty comparator comparing a sawtooth wave that is increased with a constant slope during the turn-on period of the power switch and the feedback voltage and generating an off control signal according to a comparison result, and an SR flip-flop turning on the power switch according to the on control signal and generating a gate control signal turning off the power switch according to the off control signal.

The zero crossing voltage is dependant on a voltage of an assistance coil having a predetermined turn ratio for a primary coil connected to the input voltage of the power factor corrector.

According to an exemplary embodiment of the present invention, the switch control circuit that reduces ampere total harmony distortion according to a change of an input voltage, the power factor corrector, and the driving method thereof are provided.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

The present invention will be described more fully hereinafter with reference to the accompanying drawings, in which exemplary embodiments of the invention are shown.

Figure 3:
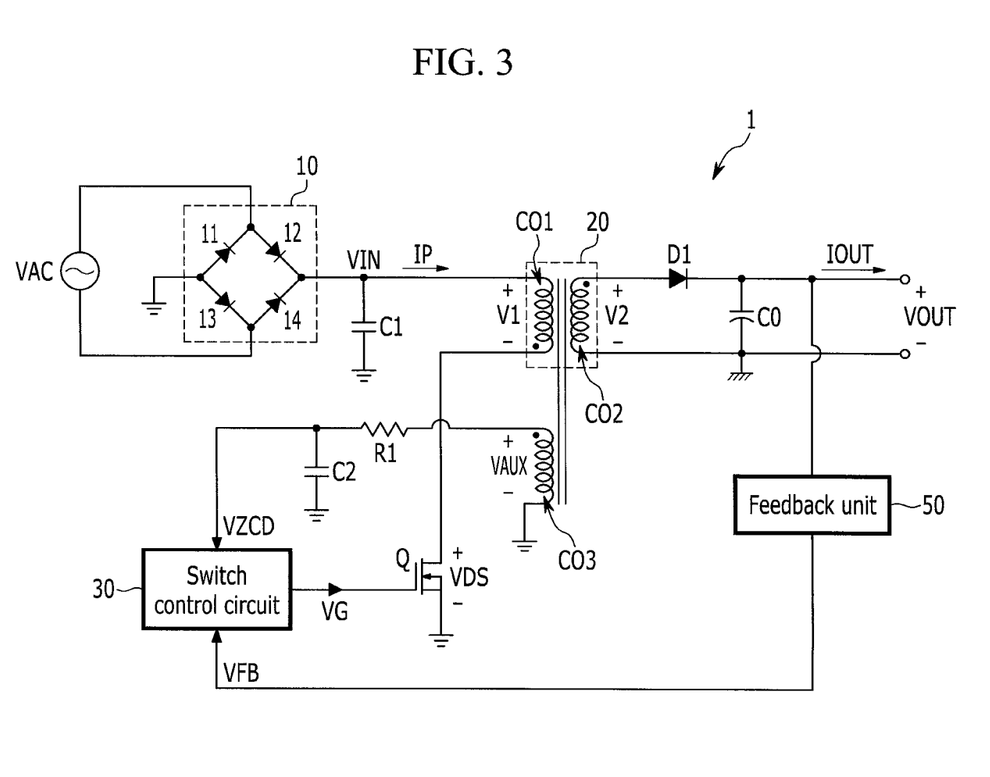
FIG. 3 is a view of a constitution of a power factor corrector according to an exemplary embodiment of the present invention.

FIG. 3 is a view of a constitution of a power factor corrector according to an exemplary embodiment of the present invention.

As shown in FIG. 3, a power factor corrector 1 includes a bridge rectification diode 10, a capacitor C1, a transformer 20, a power switch Q, a switch control circuit 30, a rectification diode D1, an output capacitor CO, an assistance coil CO3, and a feedback unit 50.

The bridge rectification diode 10 includes four diodes 11-14, thereby rectifying an AC voltage VAC to generate an input voltage VIN. The input voltage VIN passing through the bridge rectification diode 10 is dependant on a full rectified wave.

The capacitor C1 removes a noise of the input voltage VIN. The transformer 20 includes the primary coil CO1 positioned at a primary side and the secondary coil CO2 positioned at a secondary side. The primary coil CO1 includes one terminal connected to one terminal of the capacitor C1 and transmitted with the input voltage VIN, and the other terminal connected to the power switch Q.

The secondary coil CO2 is positioned at the secondary side where the output voltage is generated. A predetermined turn ratio (a turn number ns of CO2/a turn number np of CO1) is determined according to a turn number of the primary coil CO1 and a turn number of the secondary coil CO2, and a ratio of the voltage of the primary coil CO1 and the voltage of the secondary coil CO2 of the transformer 20 is dependant on the turn ratio nps.

The assistance coil CO3 is positioned at the primary side while having the predetermined turn ratio for the primary coil CO1 of the transformer 20. The voltage of the primary coil CO1 is converted according to the turn ratio (a ratio between the primary coil and the assistance coil) and is generated at the assistance coil C03. Next, the voltage of the primary coil CO1 is referred to as a primary voltage V1, the voltage of the secondary coil CO2 is referred to as a secondary voltage V2, and the voltage of the assistance coil CO3 is referred to as an assistance voltage VAUX.

The rectification diode D1 includes an anode connected to the secondary coil CO2 and a cathode connected to one terminal of the output capacitor CO. The rectification diode D1 is turned on during a turn-on period of the power switch Q, thereby rectifying the current flowing to the secondary coil CO2 to flow to a load or the output capacitor CO.

The output capacitor CO is charged by the current passing through the rectification diode D1 and supplies the current required for the load.

The feedback unit 50 generates the feedback voltage VFB corresponding to the output voltage VOUT and transmits it to the switch control circuit 30. The feedback unit 50 may generate the feedback voltage VFB corresponding to the output voltage VOUT of the secondary by using an opto-coupler.

The switch control circuit 30 controls the switching operation of the power switch Q by using the feedback voltage VFB and the zero crossing voltage VZCD. The switch control circuit 30 compares the sawtooth wave that is increased with a constant slope during an on time period of the power switch Q and the feedback voltage VFB to determine an off time of the power switch Q. The switch control circuit 30 detects a drain-source voltage VDS of the power switch Q by using a zero crossing voltage VZCD and turns on the power switch Q at a zero crossing time of the drain-source voltage VDS.

The assistance voltage VAUX is a voltage that depends on the drain-source voltage VDS of the power switch Q. The assistance voltage VAUX is connected to one terminal of the resistor R1 and is connected to the switch control circuit 30 through the resistor R1. The capacitor C2 is connected to the other terminal of the resistor R1. The voltage depending on the assistance voltage VAUX and generated at a connection node of the resistor R1 and the capacitor C2 is referred to as a zero crossing voltage VZCD. The capacitor C2 removes the noise of the zero crossing voltage VZCD.

The zero crossing voltage VZCD is a voltage that depends on the assistance voltage VAUX, thereby depending on the drain-source voltage VDS. The switch control circuit 30 determines the turn-on time of the power switch Q by using the zero crossing voltage VZCD. Here, the switch control circuit 30 controls the switching frequency to not exceed the threshold switching frequency.

The switch control circuit 30 may determine whether the switching frequency of the power switch Q exceeds the threshold frequency by using the zero crossing voltage VZCD. A detailed description thereof will be presented later with reference to FIG. 4 and FIG. 5. The switch control circuit 30 generates a gate voltage VG controlling the switching operation of the power switch Q and transmits it to the gate electrode of the power switch Q.

For a high power factor of the power factor corrector 1, the switching frequency is controlled according to the input voltage VIN. As the input voltage VIN becomes higher, the switching frequency of the power switch Q is increased. As the input voltage VIN becomes lower in the input voltage VIN of one cycle, the switching frequency becomes higher. The input voltage VIN of one cycle means one cycle of the full-rectified wave.

The switch control circuit 30 controls the switching frequency to remove the regions A1 and A2 shown in FIG. 2. The regions A1 and A2 are low voltage regions of the input voltage VIN of one cycle as the high voltage. In detail, in the conventional power factor corrector, the switching frequency of the low voltage region is very high in the input voltage of one cycle of the high level. The waveform of the input current deviates from the sine wave by the high switching frequency of the corresponding region.

The waveform of the input current is controlled according to the switching frequency of the power factor corrector. The switch control circuit 30 restricts the switching frequency. For example, the switch control circuit 30 restricts the switching frequency in the regions A1 and A2 by the threshold frequency. Thus, the slope of the input current is decreased such that a matching degree for the sine wave is increased. This may decrease the ampere total harmony distortion. The input current means an average of the current IP flowing to the primary.

The method of restricting the switching frequency by the threshold frequency increases at least once among the on time and the off time. In an exemplary embodiment of the present invention, the switching frequency is restricted by the threshold frequency by increasing the off time. However, the present invention is not limited to this method, and other methods of restricting the switching frequency by the threshold frequency may be used.

The on time according to an exemplary embodiment of the present invention is a period from a time that the zero crossing voltage VZCD is decreased to an on reference voltage to a time that the sawtooth wave arrives at the feedback voltage VFB. The off time according to an exemplary embodiment of the present invention is a period from a time that the sawtooth wave that is increased with a constant slope arrives at the feedback voltage VFB to a time that the zero crossing voltage VZCD is decreased to a predetermined on reference voltage (a voltage corresponding to the zero crossing voltage when the drain-source voltage becomes a minimum.

The output voltage of the power factor corrector 1 is constantly controlled such that the feedback voltage VFB is constantly controlled. When the feedback voltage VFB is changed according to a change of the output voltage VOUT, the switching operation frequency is controlled such that the output voltage VOUT is constantly controlled. That is, the output voltage VOUT and the feedback voltage VFB include a ripple of a predetermined range, and are constantly maintained with a corresponding predetermined level. That is, a period in which the sawtooth wave of the constant slope arrives at the feedback voltage VFB is constant.

Figure 4:
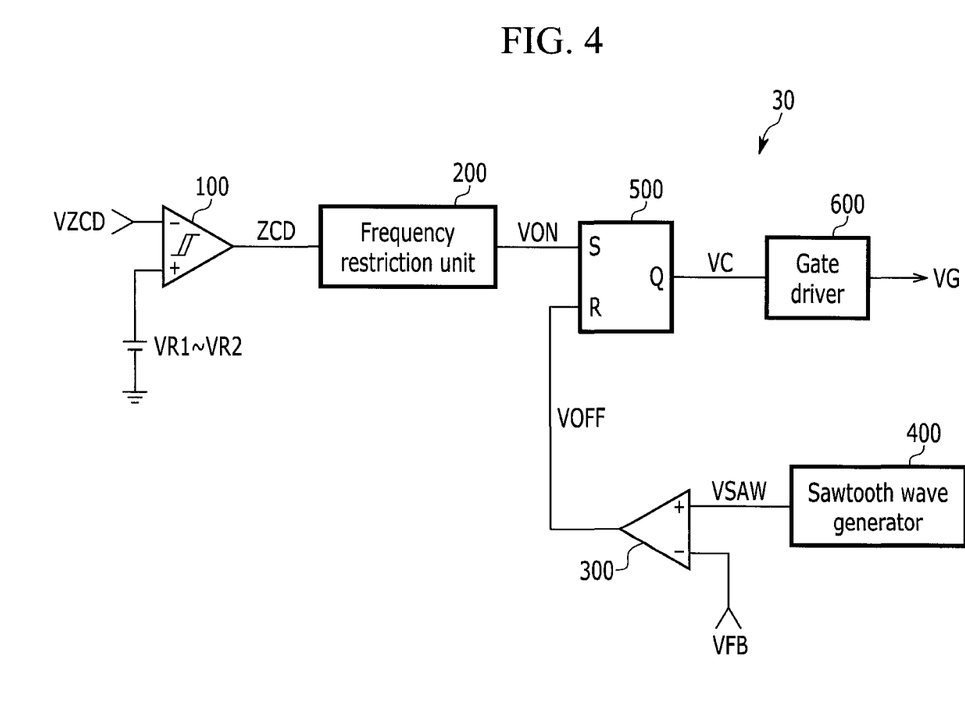
FIG. 4 is a view of a switch control circuit according to an exemplary embodiment of the present invention.

FIG. 4 is a view of a switch control circuit 30 according to an exemplary embodiment of the present invention.

As shown in FIG. 4, the switch control circuit 30 includes a zero crossing detection comparator 100, a frequency restriction unit 200, a duty comparator 300, a sawtooth wave generator 400, an SR flip-flop 500, and a gate driver 600.

The zero crossing detection comparator 100 compares the zero crossing voltage VZCD and a predetermined zero crossing reference voltage to generate a zero crossing detection signal ZCD for the turn-on of the power switch Q according to the comparison result. The zero crossing detection comparator 100 is realized by a hysteresis comparator, the reference voltage has a first reference voltage level VR1 and a second reference voltage level VR2(>VR1) according to the hysteresis characteristic, and the first reference voltage level VR1 is set up as a level to determine the turn-on time of the power switch Q.

When the zero crossing voltage VZCD is decreased, the zero crossing detection comparator 100 generates the zero crossing detection signal ZCD of the high level when the zero crossing voltage VZCD is lower than the first reference voltage level VR1. After the zero crossing voltage VZCD becomes lower than the first reference voltage level VR1, the zero crossing detection signal ZCD is maintained as the high level during a period that the zero crossing voltage VZCD is lower than the second reference voltage level VR2.

In a period in which the zero crossing voltage VZCD is increased, the zero crossing detection comparator 100 generates a zero crossing detection signal ZCD of the low level when the zero crossing voltage VZCD is higher than the second reference voltage level VR1. After the zero crossing voltage VZCD becomes higher than the second reference voltage level VR1, the zero crossing detection signal ZCD is maintained as the low level during the period that the zero crossing voltage VZCD is higher than the first reference voltage level VR2.

Hereafter, the level of the zero crossing detection signal ZCD turning on the power switch Q is referred to as an enable level. The enable level according to an exemplary embodiment of the present invention is the high level.

The frequency restriction unit 200 does not turn on the power switch Q during a predetermined screen period to restrict the switching frequency. The frequency restriction unit 200 receives the zero crossing detection signal ZCD and generates the on control signal VON in synchronization with the zero crossing detection signal ZCD of the enable level generated after the screen period is passed. The screen period is a period that is set up for the above-described threshold frequency to not exceed the switching frequency.

The frequency restriction unit 200 does not react to the zero crossing detection signal ZCD of the enable level generated in the screen period from the turn-off time of the power switch Q, and generates the on control signal VON in synchronization with the zero crossing detection signal ZCD of the enable level generated after the screen period is passed.

In detail, the frequency restriction unit 200 generates the on control signal VON in synchronization with the increasing edge of the zero crossing detection signal ZCD. The frequency restriction unit 200 determines whether the increasing edge generation time of the zero crossing detection signal ZCD is generated after the screen period is passed, and generates the on control signal ON in synchronization with the increasing edge of the zero crossing detection signal ZCD generated after the screen period. The on control signal VON according to an exemplary embodiment of the present invention is the pulse signal of the high level.

The frequency restriction unit 200 may use the off control signal VOFF to sense the turn-off time of the power switch Q.

The sawtooth wave generator 300 generates the sawtooth wave VSAW that is increased with a constant slope during the turn-on period of the power switch Q.

The duty comparator 400 compares the feedback voltage VFB and the sawtooth wave VSAW to control the constant turn-on period. The feedback voltage VFB is a voltage corresponding to the output voltage VOUT, and the output voltage VOUT is controlled with the constant level such that the feedback voltage VFB is also the constant level. Accordingly, during the turn-on period, a period in which the sawtooth wave VSAW reaches the feedback voltage VFB is constantly maintained, and the turn-on period is constantly maintained.

The duty comparator 400 includes a non-inversion terminal (+) input with the sawtooth wave VSAW and an inversion terminal (−) input with the feedback voltage VFB, and generates an off control signal VOFF for turning off the power switch Q at a time that the sawtooth wave VSAW reaches the feedback voltage VFB. The off control signal VOFF according to an exemplary embodiment of the present invention is the high level pulse.

The SR flip-flop 500 controls the turn-on of the power switch Q in synchronization with the on control signal VON and the turn-off of the power switch Q in synchronization with the off control signal VOFF. The SR flip-flop 500 includes a set terminal S, a reset terminal R, and an output terminal Q. The SR flip-flop 500 increases the level of the output signal in synchronization with the increasing edge of the signal input to the set terminal S, and decreases the level of the output signal in synchronization with the increasing edge of the signal input to the reset terminal R.

The set terminal S of the SR flip-flop 500 is input with the on control signal VON, the reset terminal R is input with the off control signal VOFF, and the output signal is output through the output terminal Q. The output signal of the SR flip-flop 500 is the gate control signal VC.

The gate driver 600 generates the gate signal VG operating the switching of the power switch Q according to the gate control signal VC.

The switch control circuit 30 senses the time that the zero crossing voltage VZCD is less than the first reference voltage level VR1 to determine whether the switching frequency exceeds the threshold frequency. That is, if the time that the zero crossing voltage VZCD is less than the first reference voltage level VR1 is generated inside the screen period, the switch control circuit 30 may determine that the switching frequency exceeds the threshold.

The switch control circuit 30 controls the turn-on time of the power switch Q by using the zero crossing voltage VZCD after the screen period so as to restrict the switching frequency to not exceed the threshold frequency.

Next, referring to FIG. 5, an operation of the power factor corrector according to an exemplary embodiment of the present invention will be described.

Figure 5:
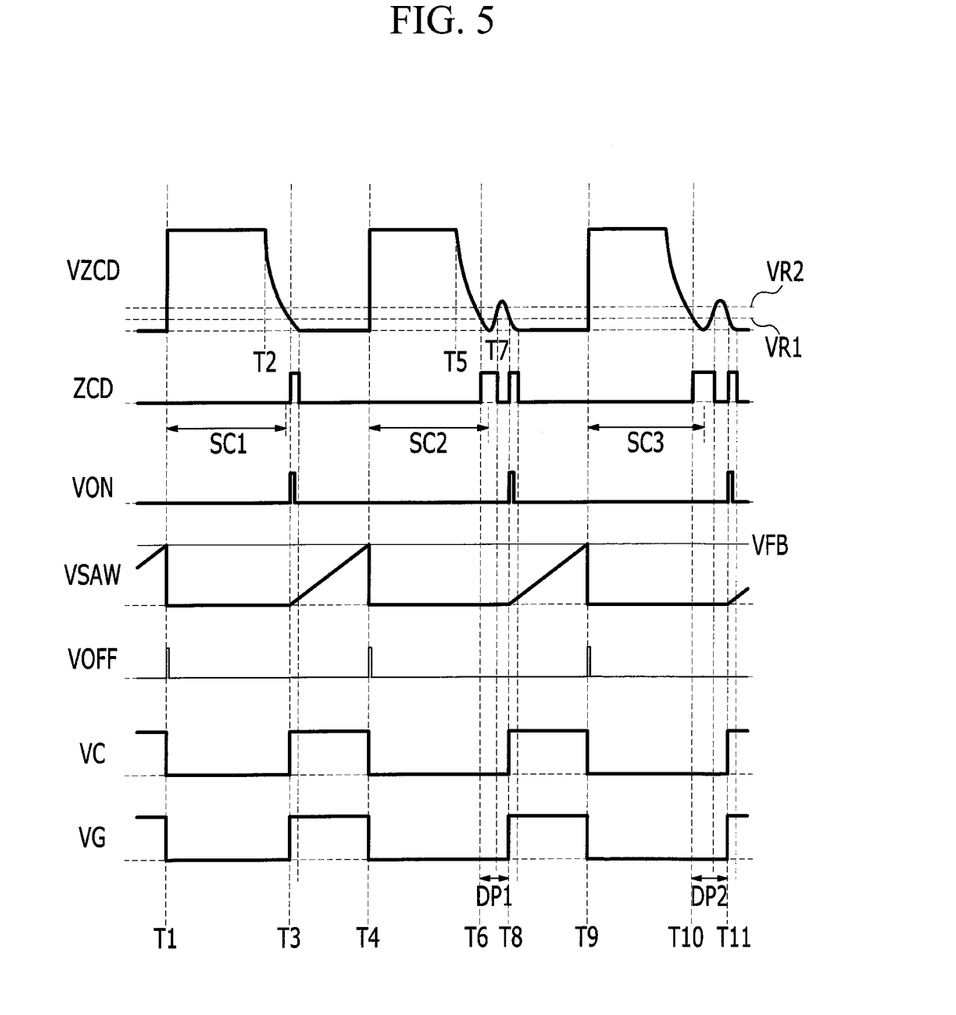
FIG. 5 is a view of a signal waveform according to an exemplary embodiment of the present invention.

FIG. 5 is a view of a signal waveform according to an exemplary embodiment of the present invention.

As shown in FIG. 5, the off control signal VOFF is generated if the sawtooth wave VSAW reaches the feedback voltage VFB at the time T1. The SR flip-flop 500 generates the gate control signal VC of the low level by the increasing edge of the off control signal VOFF. Thus, the gate driver 600 generates the gate signal VG of the low level according to the gate control signal VC of the low level. At the time T1, the power switch Q is turned off.

After the power switch Q is turned off, the zero crossing voltage VZCD is quickly decreased from the time T2. After all the energy stored to the primary is transmitted to the secondary, a resonance is formed between a magnetizing conductance (not shown) of a transformer, a leakage conductance (not shown), and a parasitic capacitance (not shown) of the power switch Q. Thus, the drain-source voltage VDS starts to decrease from the time T2, and the drain-source voltage VDS is dampened before the power switch Q is turned on.

The zero crossing voltage VZCD is dependant on the drain-source voltage VDS so as to start decreasing from the time T2. The zero crossing voltage VZCD that is decreased at the time T3 is less than the first reference voltage level VR1.

The zero crossing detection signal ZCD is increased at the time T3 such that it becomes the enable level, and the increasing edge generation time of the zero crossing detection signal ZCD is generated after the screen period SC1 is passed such that the frequency restriction unit 200 generates the on control signal ON at the time T3.

The gate control signal VC becomes the high level by the on control signal ON at the time T3, and the gate signal VG also becomes the high level.

The sawtooth wave VSAW reaches the feedback voltage VFB at the time T4, and the power switch Q is turned off.

After the power switch Q is turned off, the zero crossing voltage VZCD starts to decrease from the time T5. The zero crossing voltage VZCD that is decreased at the time T6 is less than the first reference voltage level VR1. The zero crossing detection signal ZCD is increased at the time T6 such that it becomes the enable level.

However, the increasing edge generation time of the zero crossing detection signal ZCD is generated within the screen period SC2 such that the frequency restriction unit 200 reacts to the increasing edge of the zero crossing detection signal ZCD.

If the zero crossing voltage VZCD is higher than the second reference voltage level VR2 at the time T7 according to the damping of the drain-source voltage VDS, the zero crossing detection signal ZCD becomes the low level. The zero crossing voltage VZCD is again lower than the first reference voltage level VR1 at the time T8. The time T8 is generated after the screen period SC2 such that the frequency restriction unit 200 generates the on control signal ON at the time T8.

Accordingly, the power switch Q is turned on at the time T8.

If the frequency restriction unit 200 does not exist, the power switch Q may be turned on at the time T6. However, according to an exemplary embodiment of the present invention, the power switch Q is turned on at the time T8. That is, the switching cycle is extended by a delay period DP1 such that the switching frequency is decreased.

After the power switch Q is turned off at the time T9, the time T10 when the zero crossing voltage VZCD is lower than the first reference voltage level VR1 is within the screen period SC3. Accordingly, the on control signal VON is not generated at the time T10. After the screen period SC3 is passed, the on control signal VON is generated in synchronization with the increasing edge of the zero crossing detection signal ZCD that is generated at the time T11. Accordingly, the switching cycle is extended by the delay period DP2, and the switching frequency is decreased.

As described above, the frequency restriction unit 200 blocks the turn-on of the power switch Q during the screen period such that the switching cycle is extended by the delay periods DP1 and DP2, thereby restricting the switching frequency.

As described above, the period when the switching frequency of the conventional power factor corrector is high is the regions A1 and A2 in FIG. 2, and the input ampere total harmony distortion is high in the corresponding region. The power factor corrector according to an exemplary embodiment of the present invention restricts the switching frequency of the corresponding region such that the input ampere total harmony distortion may be reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description of Symbols> power factor corrector 1, bridge rectification diode 10, smoothing capacitor C1 transformer 20, power switch Q, switch control circuit 30, rectification diode D1 diode 11-14, output capacitor CO, assistance coil CO3, feedback unit 50 zero crossing detection comparator 100, frequency restriction unit 200, sawtooth wave generator 400 duty comparator 300, SR flip-flop 500, gate driver 600, resistor R1 capacitor C2

What is claimed is:

1. A power factor corrector comprising:
a power switch; and
a switch control circuit receiving a zero crossing voltage to sense the voltage of both terminals of the power switch and a feedback voltage corresponding to an output voltage, controlling a turn-on time of the power switch by using the zero crossing voltage, and controlling a turn-off time of the power switch by using the feedback voltage,
wherein the switch control circuit senses a switching frequency of the power switch by using the zero crossing voltage and restricts the switching frequency by a predetermined threshold frequency.

2. The power factor corrector of claim 1, wherein
the switch control circuit controls the turn-on time of the power switch by using the zero crossing voltage after a predetermined screen period corresponding to the threshold frequency from a time that the power switch is turned off.

3. The power factor corrector of claim 2, wherein
the switch control circuit includes:
a zero crossing detection comparator controlling a zero crossing reference voltage to control the turn-on time and the zero crossing voltage and generating a zero crossing detection signal according to a comparison result, and
a frequency restriction unit generating the on control signal to turn on the power switch in synchronization with the zero crossing detection signal of an enable level generated after the screen period is passed.

4. The power factor corrector of claim 3, wherein
the zero crossing detection comparator includes
an inversion terminal input with the zero crossing voltage and
a non-inversion terminal input with the zero crossing reference voltage, and
generates the zero crossing detection signal of the enable level at a time that the zero crossing voltage becomes lower than the zero crossing reference voltage.

5. The power factor corrector of claim 4, wherein
the zero crossing detection comparator is realized as a hysteresis comparator,
the zero crossing reference voltage includes a first reference voltage level and a second reference voltage level higher than the first reference voltage level according to a hysteresis characteristic,
and the zero crossing detection comparator generates the zero crossing detection signal of the enable level at a time that the zero crossing voltage is lower than the first reference voltage.

6. The power factor corrector of claim 3, wherein
the switch control circuit further includes
a duty comparator comparing a sawtooth wave that is increased with a constant slope during the turn-on period of the power switch and the feedback voltage and generating an off control signal according to a comparison result, and
an SR flip-flop turning on the power switch according to the on control signal and generating a gate control signal turning off the power switch according to the off control signal.

7. The power factor corrector of claim 6, wherein
the duty comparator includes
an inversion terminal input with the feedback voltage, and
a non-inversion terminal input with the sawtooth wave, and
the SR flip-flop generates the gate control signal turning on the power switch in synchronization with the increasing edge of the on control signal and turning off the power switch in synchronization with the increasing edge of the off control signal.

8. The power factor corrector of claim 1, wherein
the power factor corrector further includes
an assistance coil having a primary coil of a primary side transmitted with an input voltage, a secondary coil of a secondary side with which the output voltage is generated, and a predetermined turn ratio with the primary coil, and
the zero crossing voltage is dependant on an assistance voltage generated at the assistance coil.

9. The power factor corrector of claim 8, wherein
the switch control circuit includes
a zero crossing detection comparator comparing a predetermined zero crossing reference voltage to control the turn-on time of the power switch and the zero crossing voltage,
a resistor having one terminal connected to the zero crossing detection comparator and the other terminal connected to the assistance coil, and
a capacitor connected to one terminal of the resistor.

10. A method of driving a power factor corrector receiving an input voltage and generating an output voltage according to a switching operation of a power switch, comprising;
controlling a turn-on time of the power switch for a switching frequency of the power switch to not exceed a predetermined threshold frequency by using a zero crossing voltage to sense the voltage of both terminals of the power switch; and
controlling the turn-off time of the power switch by using a feedback voltage corresponding to the output voltage.

11. The method of claim 10, wherein
the controlling of the turn-on time includes
controlling the turn-on time of the power switch by using the zero crossing voltage after a predetermined screen period corresponding to the threshold frequency from a time that the power switch is turned off.

12. The method of claim 11, wherein
the controlling of the turn-on time includes
comparing the zero crossing reference voltage to control the turn-on time and the zero crossing voltage and generating the zero crossing detection signal according to the comparison result, and
generating the on control signal to turn on the power switch in synchronization with the zero crossing detection signal of an enable level generated after the screen period is passed.

13. The method of claim 12, wherein
the generating of the zero crossing detection signal includes
generating the zero crossing detection signal of the enable level at a time that the zero crossing voltage is lower than the zero crossing reference voltage.

14. The method of claim 13, wherein
the zero crossing detection comparator is realized by a hysteresis comparator,
the zero crossing reference voltage includes a first reference voltage level and a second reference voltage level higher than the first reference voltage level according to a hysteresis characteristic, and
the generating of the zero crossing detection signal of the enable level is generating the zero crossing detection signal of the enable level at a time that the zero crossing voltage is lower than the first reference voltage.

15. The method of claim 10, wherein
the controlling of the turn-off time includes
comparing a sawtooth wave that is increased with a constant slope during the turn-on period of the power switch and the feedback voltage, and controlling the turn-off time according to the comparison result.

16. The method of claim 10, wherein
the power factor corrector further includes a primary coil of a primary side transmitted with the input voltage, a secondary coil of a secondary side at which the output voltage is generated, and an assistance coil having a predetermined turn ratio with the primary coil, and
the zero crossing voltage is dependant on the assistance voltage that is generated at the assistance coil.

17. A switch control circuit of a power factor corrector receiving an input voltage and generating an output voltage according to a switching operation of a power switch, comprising:
a zero crossing detection comparator comparing a zero crossing voltage to sense the voltage of both terminals of the power switch and a zero crossing reference voltage to control the turn-on time and generating the zero crossing detection signal according to the comparison result; and
a frequency restriction unit generating an on control signal to turn on the power switch in synchronization with the zero crossing detection signal of an enable level after the screen period is passed,
wherein the screen period is a period corresponding to the threshold frequency when the switching frequency of the power switch is restricted by a predetermined threshold frequency.

18. The switch control circuit of claim 17, wherein
the zero crossing detection comparator is realized as a hysteresis comparator,
the zero crossing reference voltage includes a first reference voltage level and a second reference voltage level higher than the first reference voltage level according to a hysteresis characteristic, and
the zero crossing detection comparator generates the zero crossing detection signal of the enable level at a time that the zero crossing voltage is lower than the first reference voltage.

19. The switch control circuit of claim 17, wherein
the switch control circuit further includes
a duty comparator comparing a sawtooth wave that is increased with a constant slope during the turn-on period of the power switch and the feedback voltage and generating an off control signal according to a comparison result, and
an SR flip-flop turning on the power switch according to the on control signal and generating a gate control signal turning off the power switch according to the off control signal.

20. The switch control circuit of claim 17, wherein
the zero crossing voltage is dependant on a voltage of an assistance coil having a predetermined turn ratio for a primary coil connected to the input voltage of the power factor corrector.

\* \* \* \* \*